(12) United States Patent
Irie

(10) Patent No.: US 6,471,306 B2
(45) Date of Patent: Oct. 29, 2002

(54) TRACTION CONTROL APPARATUS AND METHOD FOR FOUR-WHEEL DRIVE VEHICLE

(75) Inventor: Yoshiaki Irie, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/764,303

(22) Filed: Jan. 19, 2001

(65) Prior Publication Data

US 2001/0013439 A1 Aug. 16, 2001

(30) Foreign Application Priority Data

Feb. 10, 2000 (JP) ........................................ 2000-033656

(51) Int. Cl.⁷ ................................................ B60T 8/58
(52) U.S. Cl. ........................................ 303/190; 303/186
(58) Field of Search .................... 303/140, 186–190; 188/197, 244; 701/83

(56) References Cited

U.S. PATENT DOCUMENTS

| | | | |
|---|---|---|---|
| 4,981,190 A | | 1/1991 | Nakayama et al. |
| 5,041,978 A | | 8/1991 | Nakayama et al. |
| 5,551,771 A | * | 9/1996 | Akuzawa et al. ............ 303/186 |
| 5,634,699 A | * | 6/1997 | Ichikawa et al. ........... 303/150 |
| 6,059,065 A | * | 5/2000 | Takeda et al. ............... 180/244 |

FOREIGN PATENT DOCUMENTS

JP        10-217932        8/1998

\* cited by examiner

*Primary Examiner*—Christopher P. Schwartz
(74) *Attorney, Agent, or Firm*—Oliff & Berridge, PLC

(57) ABSTRACT

A traction control apparatus for a four-wheel drive vehicle simultaneously sets an equal control amount $\Delta VWRL = \Delta VWRR$ for brake devices on the side of rear-left and rear-right wheels if at least one of the rear wheels is driven with a low grip degree. Thereby the slip tendency of the rear wheels is weakened, and the behavior of the vehicle is shifted in a stabilizing direction.

14 Claims, 5 Drawing Sheets

TRACTION CONTROL APPARATUS AND METHOD FOR FOUR-WHEEL DRIVE VEHICLE

INCORPORATION BY REFERENCE

The disclosure of Japanese patent Application No. 2000-033656 filed on Feb. 10, 2000 including the specification, drawings and abstract is incorporated herein by reference in its entirety.

BACKGROUND OF THE INVENTION

1. Field of the Invention

The invention relates to a traction control apparatus disposed in a four-wheel drive vehicle to control driving forces generated between four driven wheels and a road surface, and to a method of traction control.

2. Description of Related Art

Japanese Patent Application Laid-Open No. 10-217932 discloses one example of a traction control apparatus to be installed in a four-wheel drive car. The traction control, apparatus disclosed therein controls if there is generated a difference in rotational speeds of driven wheels, braking forces applied to the respective driven wheels such that the rotational speed difference is reduced. This makes it possible to achieve substantially the same effect as in the case where a differential limiting mechanism is added to a differential.

However, the braking forces applied to the respective driven wheels are controlled based on the difference in the rotational speeds of the driven wheels. Thus, for example, if the inner ones of the turning wheels have developed a tendency to slip and increased in rotational speed, the braking forces applied to the inner ones of the turning wheels may increase, and the braking forces applied to the outer ones of the turning wheels may decrease. In such a case, the controllability of the vehicle behavior may deteriorate. If all the four driven wheels have developed a tendency to slip-to the same extent, there may be no difference generated among the rotational speeds of the driven wheels. This makes it impossible to set braking forces suited for the respective driven wheels. Also in this case, the controllability of the vehicle behavior may deteriorate.

SUMMARY OF THE INVENTION

It is one object of the invention to provide a traction control apparatus and method suited for a four-wheel drive vehicle and capable of controlling the vehicle behavior in a stabilizing direction even if driven wheels have developed a tendency to slip.

A traction control apparatus for a four-wheel drive vehicle according to a first aspect of the invention is disposed in a four-wheel drive vehicle in which driving torques of a drive source are distributed to front-left and front-right wheels and to rear-left and rear-right wheels, and controls driving forces generated between the respective wheels and a road surface. The traction control apparatus includes brake devices disposed in the respective wheels, which generate predetermined braking forces to brake rotation of the wheels, and a controller individually controlling the braking forces generated in the respective brake devices. In this traction control apparatus, the controller simultaneously generates an equal braking force in the brake devices corresponding to the rear-left and rear-right wheels if it is judged that a critical driving force applied to at least one of the rear-left and rear-right wheels is small.

The critical driving force is a driving force that could be generated between the respective driven wheels and the road surface with an unlimited differential among the driven wheels and corresponds in magnitude to the friction coefficient of the road surface and the grounding loads applied to the driven-wheels.

A driven wheel with a small critical driving force may develop a tendency to idle-rotate (spin) when the vehicle is started or accelerated. If at least one of the rear wheels has developed a tendency to idle-rotate the grip degree of a tire mounted to the idle-rotating wheel decreases, and the grip balance between the rear-left and rear-right wheels is lost. This may cause a deterioration of the controllability of the vehicle behavior. Thus, in such a case, the controller simultaneously generates an equal braking force in the rear-left and rear-right wheels, and the brake devices absorb the driving torques distributed to the rear-left and rear-right wheels to the same extent. Thereby the idle-rotating tendency on the side of the rear wheels is weakened, and the grip balance tends to be recovered. At the same time, the driving forces applied to the front wheels become greater than those applied to the rear wheels, so that the vehicle body tends to be pulled forward by the front wheels. Due to such an operation, the behavior of the vehicle body can be shifted in a stabilizing direction.

In the aforementioned aspect, the controller may set the braking forces if it is judged that at least one of the rear-left and rear-right wheels tends to slip, in reference to the greater one of slip amounts of the rear-left and ear-right wheels.

If at least one of the rear wheels has developed a tendency of accelerated slip, the braking forces are set so as to curb the slip, in reference to the greater one of the slip amounts generated on the side of the rear wheels. Therefore, the braking forces can be suitably set in accordance with the slip state, and the vehicle behavior can be stabilized in a suitable manner.

In the aforementioned aspect, the controller may simultaneously generate an equal braking force in the brake devices corresponding to the rear-left and rear-right wheels if it is judged that all four wheels tend to slip.

If all four wheels have developed a tendency to slip, it becomes difficult to detect slip amounts with precision. In the case where all four wheels tend to slip, the braking forces to be generated by the brake devices are set by the controller according to the setting method characteristic of such a case. For example, the braking forces to be applied are determined in advance. In this case, since the equal braking force is applied to the rear-left and rear-right wheels, the vehicle behavior can be shifted in a stabilizing direction without being adversely affected.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENT(S)

Hereinafter, an embodiment of the invention will be described with reference to the attached drawings.

Figure 1:
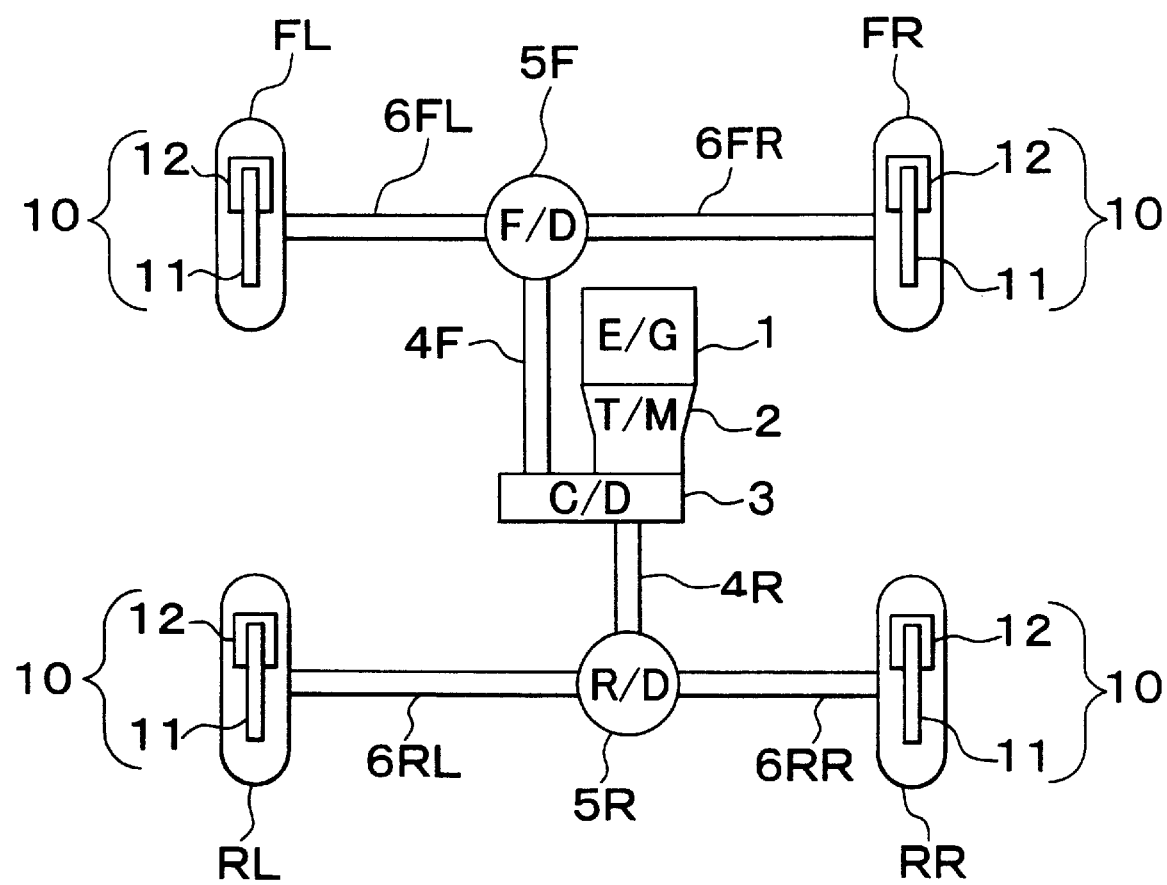
FIG. 1 is a structural view schematically showing the drive system of a four-wheel drive vehicle equipped with a traction control apparatus according to an embodiment of the invention.

FIG. 1 schematically shows the drive system of a four-wheel drive vehicle equipped with a traction control apparatus according to an embodiment of the invention. The rotational output of an engine 1 is changed in speed through a transmission 2 and then distributed to a front-wheel-side drive shaft 4F and a rear-wheel-side drive shaft 4R through a center differential 3. The front-wheel-side dive shaft 4F is coupled to left and right drive shafts 6FL, 6FR through a front differential 5F, and the rear-wheel-side drive shaft 4R is coupled to left and right drive shafts 6RL, 6RR through a rear differential 5R. The driving torque of the engine 1 is distributed to the respective wheels FL, FR, RL and RR.

The wheels FL, FR, RL and RR have brake devices 10, which constitute disc brakes having disc rotors 11 rotating together with the wheels FL, FR, RL and RR and calipers 12 disposed on outer peripheral portions of the disc rotors 11. Although not shown in detail, each of the calipers 12 is constructed with a brake cylinder 26 (see FIG. 2) accommodating a friction pad for abutment on both lateral faces of the disc rotor 11 and a pressing piston for pressing the friction pad against the disc rotor 11 using the supplied fluid pressure.

Figure 2:
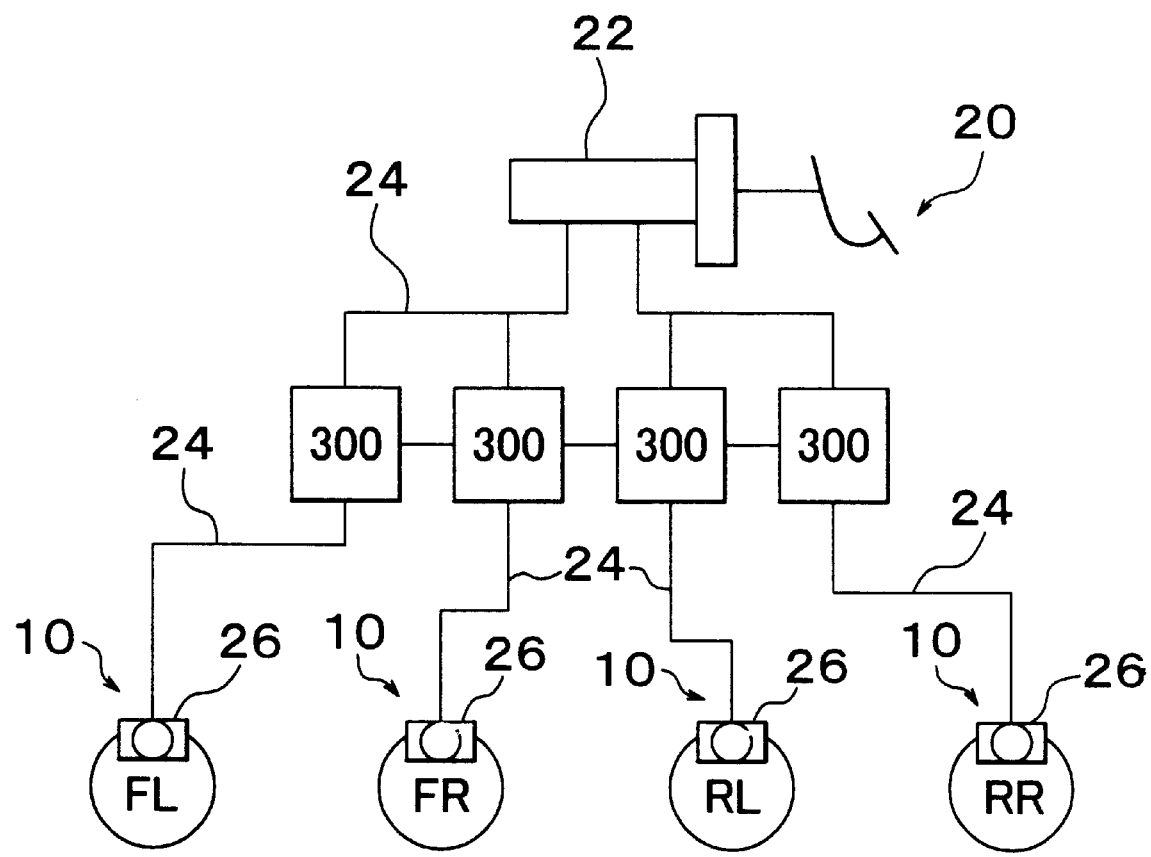
FIG. 2 is a fluid pressure system diagram showing a fluid pressure control system.

FIG. 2 shows a fluid pressure control system for operating the brake devices 10 disposed in the wheels FL, FR, RL and RR. A master cylinder 22 has two separate pressurizing chambers arranged in series, and the operation of a brake pedal 20 is transmitted to pistons in the pressurizing chambers of the master cylinder 22. Thereby, fluid pressures corresponding to the operating force applied to the brake pedal 20 are generated in the pressurizing chambers. The fluid pressures generated in the respective pressurizing chambers are introduced into fluid pressure control devices 300 through fluid pressure conduits 24, controlled by the fluid pressure control devices 300, and supplied to the brake cylinders 26 of the respective brake devices 10 through the fluid pressure conduits 24.

The fluid pressure control devices 300 can be switched among four control states, namely, a state where the brake cylinders 26 communicate with the master cylinder 22, a state where the brake cylinders 26 communicate with a reservoir (not shown), a state where the brake cylinders 26 communicate with a fluid pressure pump (not shown) as a fluid pressure source other than the master cylinder 22, and a state where the flow of a fluid into and from the brake cylinders 26 is shut off. The switching of the fluid pressure control devices 300 is performed by switching fluid passages using magnetic forces generated in solenoid coils disposed inside the fluid pressure control devices 300. Thereby three control states, namely, a pressure-increasing state, a pressure-decreasing state and a pressure-holding state can be switched from one to another.

Figure 3:
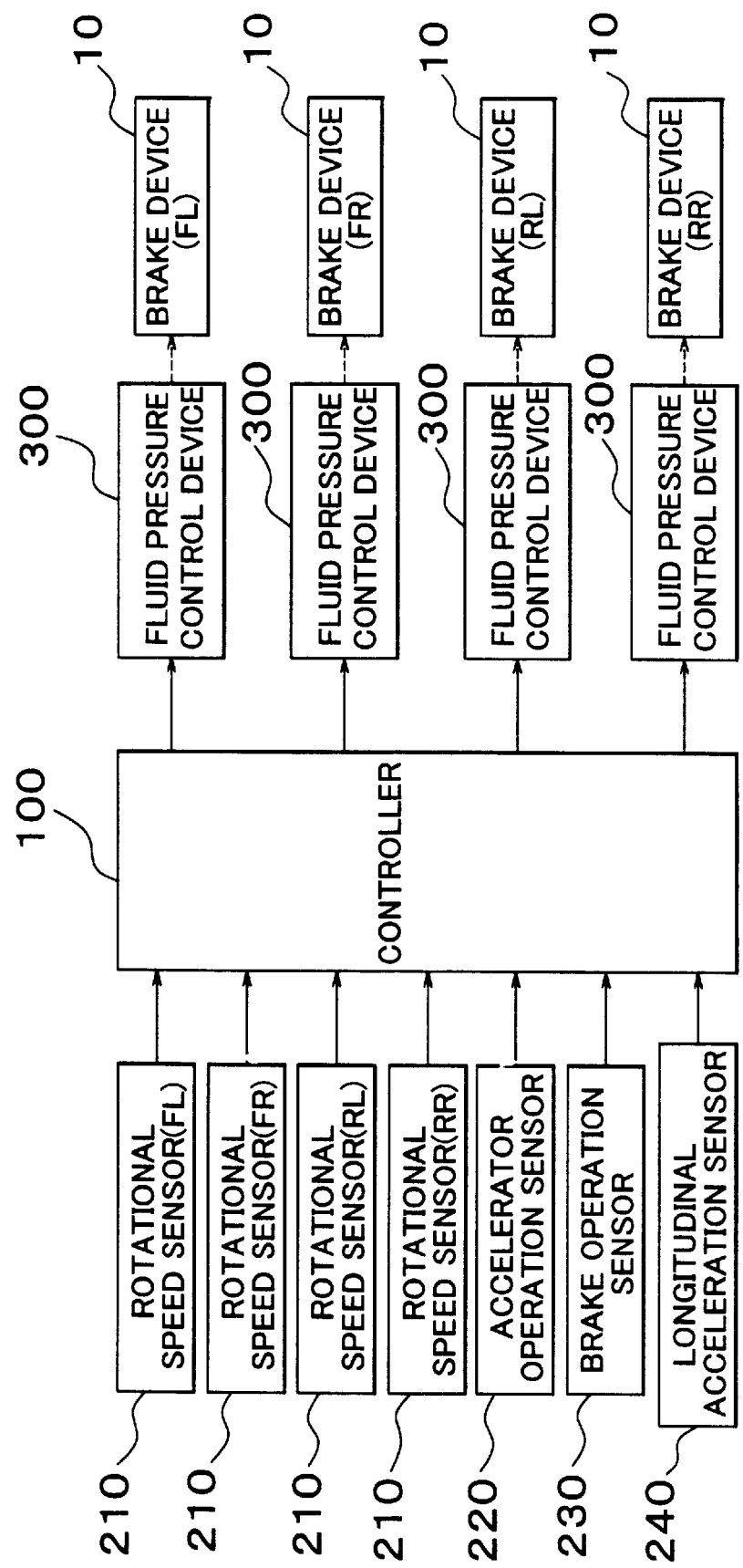
FIG. 3 is a general electric structural view of the traction control apparatus.

A controller 100 performs operation control of the fluid pressure control devices 300 thus constructed. FIG. 3 is a general electric structural view of the traction control apparatus including the controller 100. As detecting portions for detecting state quantities of the vehicle and states of operation by the driver, the traction control apparatus has various sensors. Four rotational speed sensors 210 detect rotational speeds of the wheels FL, FR, RL and RR. An accelerator operation sensor 220 detects the operation of an accelerator by the driver. A braking operation sensor 230 detects braking operation. A longitudinal acceleration sensor 240 detects the longitudinal acceleration acting on the vehicle, and the like. Detection results from the respective sensors 210 through 240 are supplied to the controller 100. Based on the detection results, the controller 100 performs operation control of the fluid pressure control devices 300.

The control processings performed by the controller 100 will be described with reference to a flowchart shown in FIG. 4.

The routine shown in this flowchart is started by turning an ignition switch on. First, the operation proceeds to step (hereinafter referred to as "S") 102 where the detection results of sensors respectively denoted by reference numerals 210 through 240 in FIG. 3 are read.

Then in S104, it is judged whether or not the vehicle is in its accelerated state. It is judged herein, as an example, that the vehicle is in its accelerated state, if the accelerator operation sensor 220 has detected operation of the accelerator and if the braking operation sensor 230 has not detected braking operation. If it is judged that the vehicle is not in its accelerated state ("No" in S104), the operation again returns to S102. If it is judged that the vehicle is in its accelerated state ("Yes" in S104), the operation proceeds to S106.

In S106, the rotational speeds VWFL, VWFR, VWRL and VWRR of the wheels FL, FR, RL and RR read in S102 are compared with criterion values $VW^{}_{-guard}$ ("" indicating "FL", "FR", "RL" or "RR") respectively. Based on the rotational speeds $VW^{}$ read the preceding time that the FIG. 4 routine was executed ("the preceding time"), the acceleration g detected by the longitudinal acceleration sensor 240, and the time interval between calculation timings for the preceding routine and the present routine (i.e., the present execution of the FIG. 4 routine), the criterion values $VW^{}_{-guard}$ are set as upper limit values of the rotational speeds $VW^{}$ that could change (increase) during the time interval. For each of the wheels FL, FR, RL and RR, the criterion value $VW^{}_{-guard}$ thus set is compared with the rotational speed $VW^{}$. It is then judged whether or not there is a wheel whose rotational speed $VW^{}$ is greater than the criterion value $VW^{}_{-guard}$. If "No" in S106, namely, if there is no wheel satisfying the condition of $VW^{}>VW^{}_{-guards}$ the operation returns to S102 so that the processings in S102 and the subsequent steps are repeated. If "Yes" in S106, namely, 30 if there is a wheel satisfying the condition of $VW^{}>VW^{**}_{-guard}$, the operation proceeds to S108.

In S108, the slip amounts $VW^{}_{-Slip}$ of the wheels FL, FR, RL and RR are calculated based on an equation (1) shown below. In the equation (1), "$VT^{}$" represents the reference rotational speed of the respective heels. This value is obtained by estimating a vehicle body speed based on the minimum one of the rotational speeds $VW^{}$ of the four wheels and converting it into the rotational speed of the respective wheels. Accordingly, the slip amount $VW^{}_{-Slip}$ is set as the deviation of the rotational speed $VW^{}$ from the reference rotational speed $VT^{}$. However, if the calculation results in $VW^{}_{-Slip} \leq 0$, the slip amount $VW^{}_{-Slip}$ is set to 0.

$$VW^{}_{-Slip} = VW^{} - VT^{**} \qquad (1)$$

Then in S110, it is judged whether or not the grip degree of tires is high, as to both the rear-left and rear-right wheels RL, RR. In general, if the friction coefficient $\mu$ between driven wheels and the road surface decreases, or if the grounding loads applied to the driven wheels decrease, the critical driving forces applied to the driven wheels decrease so that the grip degree of the tires lowers. If the grip degree of the tires decreases, the driven wheels tend to slip. Accordingly, as an example of methods of the judgment in S110, it is possible to judge based on the slip amounts $VWRL_{-Slip}$, $VWRR_{-Slip}$ of the rear-left and rear-right wheels RL, RR whether or not the grip degrees of the rear-left and rear-right wheels RL, RR are high. More specifically, it is judged that the grip degrees are high if the slip amounts $VWRL_{-Slip}$, $VWRR_{-Slip}$ are smaller than a predetermined value $S_{th}$, and it is judged that the grip degrees are low if the slip amounts $VWRL_{-Slip}$, $VWRR_{-Slip}$ are equal to or greater than the predetermined value $S_{th}$.

If "Yes" in S110, namely, if it is judged that the grip degrees of the rear-left and rear-right wheels RL, RR are both high, the operation proceeds to S112 where the control amounts ΔVW for the wheels FL, FR, RL and RR are set based on equations (2) through (5) shown below. The control amounts ΔVW are set for the relevant fluid pressure control devices 300 so that braking forces for reducing the rotational speeds of the wheels by ΔVW** are generated in the brake devices 10.

$$\Delta VWFL = KA \cdot VWFL_{-Slip} - VWFR_{-Slip} + KB \cdot (VWAVF_{-Slip} - VWAVR_{-Slip}) \quad (2)$$

$$\Delta VWFR = KA \cdot VWFR_{-Slip} - VWFL_{-Slip} + KB \cdot (VWAVF_{-Slip} - VWAVR_{-Slip}) \quad (3)$$

$$\Delta VWRL = KA \cdot VWRL_{-Slip} - VWRR_{-Slip} + KB \cdot (VWAVR_{-Slip} - VWAVF_{-Slip}) \quad (4)$$

$$\Delta VWRR = KA \cdot VWRR_{-Slip} - VWRL_{-Slip} + KB \cdot (VWAVR_{-Slip} - VWAVF_{-Slip}) \quad (5)$$

In the equations (2) through (5), "KA" and "KB" represent gain coefficients that are variably set in accordance with the running state of the vehicle or the condition of the road surface. The values "$VWAVF_{-Slip}$" and "$VWAVR_{-Slip}$" are respectively set based on equations (6), (7) shown below. The value $VWAVF_{-Slip}$ is set to 0 if $VWAVF_{-Slip} < 0$ as a result of the setting based on the equations (6), (7), and the value $VWAVR_{-Slip}$ is set to 0 if $VWAVR_{-Slip} < 0$ as a result of the setting based on the equations (6), (7).

$VWAVF_{-Slip}$=(the average of the rotational speeds of the front wheels)−(the average of the reference rotational speeds of the front wheels)

$$VWAVF_{-Slip} = \text{(the average of the rotational speeds of the front wheels)} - \text{(the average of the reference rotational speeds of the front wheels)} \quad (6)$$

$$= \{(VWFL + VWFR)/2\} - \{(VTFL + VTFR)/2\}$$

$$= \{(VWRL + VWRR)/2\} - \{(VTRL + VTRR)/2\} \quad (7)$$

The operation then proceeds to S114 where control signals corresponding to the control amounts ΔVW** set in S112 are output to the relevant fluid pressure control devices 300. The routine is then terminated, and the processing in S102 and the subsequent steps are repeated.

On the other hand, if "No" in S110, namely, if it is judged that the grip degree of one of the rear-left and rear-right wheels RL, RR is low or that the grip degrees of both the rear-left and rear-right wheels RL, RR are low, the operation proceeds to S116 where it is judged whether or not all the four wheels are in their accelerated slip states. This applies to the case where all the four wheels satisfy the condition of $VW > VW_{-guard}$ in S106.

If it is not judged in S116 that "all the four wheels are in their accelerated slip states" (if "No" in S116), the operation proceeds to S118 where the control amounts ΔVWFL, ΔVWFR for the front-left and front-right wheels FL, FR are set based on equations (8), (9) shown below. In the equations (8), (9), "KA" represents a gain coefficient that is variably set in accordance with the running state of the vehicle or the condition of the road surface.

$$\Delta VWFL = KA \cdot VWFL_{-Slip} - VWFR_{-Slip} \quad (8)$$

$$\Delta VWFR = KA \cdot VWFR_{-Slip} - VWFL_{-Slip} \quad (9)$$

Using the equation (8), the control amount ΔVWFL for the fluid pressure control device 300 on the side of the front-left wheel FL is set as a value that is obtained by subtracting the slip amount $VWFR_{-Slip}$ of the front-right wheel FR from the product of the slip amount $VWFL_{-Slip}$ of the front-left wheel FL and the gain coefficient KA. Using the equation (9), the control amount ΔVWFR for the fluid pressure control device 300 on the side of the front-right wheel FR is set as a value that is obtained by subtracting the slip amount $VWFL_{-Slip}$ of the front-left wheel FL from the product of the slip amount $VWFR_{-Slip}$ of the front-right wheel FR and the gain coefficient KA. Thus, for the front wheels, the control amounts ΔVWFL, ΔVWFR are set such that the difference between the rotational speeds of the left and right wheels is reduced.

Then in S120, the control amounts ΔVWRL, ΔVWRR for the rear-left and rear-right wheels RL, RR are set based on an equation (10) shown below.

$$\Delta VWRL = \Delta VWRR \quad (10)$$
$$= \text{MAX}(KA \cdot VWRL_{-Slip} - VWRR_{-Slip},$$
$$KA \cdot VWRR_{-Slip} - VWRL_{-Slip})$$

In the equation (10), "KA" represents a gain coefficient that is variably set in accordance with the running state of the vehicle or the condition of the road surface. It is to be noted herein that "MAX (a, b)" means the greater one of the values in the parenthesis, namely, "a" and "b". Accordingly, in the equation (10), a=KA·$VWRL_{-Slip}$−$VWRR_{-Slip}$, and b=KA·$VWRR_{-Slip}$−$VWRL_{-Slip}$. The greater one of both the calculation results a, b is set as the control amount ΔVWRL= ΔVWRR for the rear-left and rear-right wheels RL, RR. The calculation result a is set as a value that is obtained by subtracting the slip amount $VWRR_{-Slip}$ of the rear-right wheel RR from the product of the slip amount $VWRL_{-Slip}$ of the rear-left wheel RL and the gain coefficient KA. The calculation result b is set as a value that is obtained by subtracting the slip amount $VWRL_{-Slip}$ of the rear-left wheel RL from the product of the slip amount $VWRR_{-Slip}$ of the rear-right wheel RR and the gain coefficient KA.

Thereafter, the operation proceeds to S114. The control signals corresponding to the respective control amounts ΔVW** set in S118 and S120 are output to the relevant fluid pressure control devices 300. The routine is then terminated, and the processing in S102 and the subsequent steps are repeated.

In this manner, if it is judged that the grip degree of one of the rear-left and rear-right wheels RL, RR is low or that the grip degrees of both the rear-left and rear-right wheels RL, RR are low, the equal control amount ΔVWRL= ΔVWRR is set in reference to the greater one of the slip amounts generated on the side of the rear wheels. As a result, the equal braking force is simultaneously applied to the rear-left and rear-right wheels RL, RR. Accordingly, the driving torques of the engine 1 distributed to the rear-left and rear-right wheels RL, RR are simultaneously absorbed by the brake devices 10 to an equal extent. Therefore, the idle-rotating tendency on the side of the rear wheels is weakened, and the grip balance on the side of the rear wheels tends to be recovered. At the same time, the driving forces applied to the front wheels become greater than those applied to the rear wheels, so that the vehicle body tends to be pulled forward by the front wheels. Due to such an operation, the spinning tendency of the vehicle resulting from the power-over on the side of the rear wheels can be weakened, and the behavior of the vehicle body can be shifted in a stabilizing direction.

On the other hand, if "Yes" in S116, namely, if all four wheels are in their accelerated slip states, the operation proceeds to S122 where the control amounts ΔVWFL, ΔVWFR for the fluid pressure control devices 300 for the front-left and front-right wheels FL, FR are set such that ΔVWFL=ΔVWFR=0. By thus setting the control amounts ΔVWFL=ΔVWFR=0, the braking forces associated with traction control are not applied to the front-left and front-right wheels FL, FR.

Then in S124, after the control amounts ΔVWRL, ΔVWRR for the rear-left and rear-right wheels RL, RR have been set, the operation proceeds to the aforementioned S114. The control amounts ΔVWRL, ΔVWRR are set, for example, based on an equation (11) shown below.

$$\Delta VWRL = \Delta VWRR \qquad (11)$$
$$= \{(VWRL + VWRR)/2\} -$$
$$\text{(the estimated vehicle body speed)}$$

Thereby the equal braking forces corresponding to the control amount ΔVWRL=ΔVWRR set in the equation (11) are simultaneously applied to the rear-left and rear-right wheels RL, RR. The rotational speeds of the rear-left and rear-right wheels are reduced by the control amount ΔVWRL, ΔVWRR. In this state, it would be desirable to set, in accordance with the generated slip amounts, the control amounts ΔVWRL, ΔVWRR for applying braking forces to the respective wheels FL, FR, RL and RR. However, if all four wheels are in their slip states, it is difficult to detect the slip amounts with precision. Thus, in S124, as indicated by the equation (11), the control amounts ΔVWRL, ΔVWRR are set based on the difference between the average of the rotational speeds VWRL, VWRR of the rear-left and rear-right wheels RL, RR and the vehicle body speed estimated in S108. Alternatively, in S124, the predefined single control amount may be set to ΔVWRL or ΔVWRR.

Thus, if all four wheels are in their accelerated slip states, ΔVWFL=ΔVWFR=0. Therefore, the control amounts based on the slip state are not set for the front-left and front-right wheels FL, FR, and the equal control amount ΔVWRL=ΔVWRR is set for the rear-left and rear-right wheels RL, RR. Because of this setting process, the equal braking force is simultaneously generated in the brake devices 10 corresponding to the rear-left and rear-right wheels RL, RR. Thus, the grip force on the side of the rear wheels tends to be recovered, and the spinning tendency of the vehicle resulting from the power-over on the side of the rear wheels can be weakened. Therefore, the behavior of the vehicle body can be surely shifted in a stabilizing direction.

Figure 5:
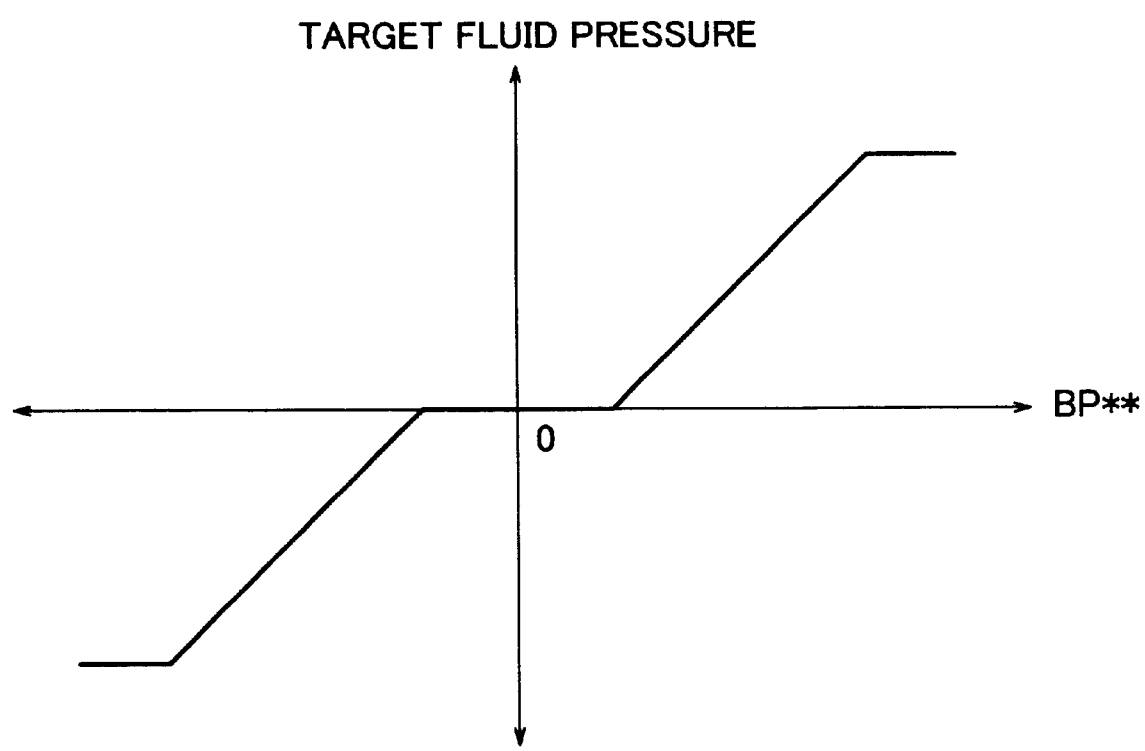
FIG. 5 is a map showing a relation between target fluid pressures and control signals set in accordance with control amounts.

One example of processings performed in S114 will be described. It is assumed herein that the control signals for the respective fluid pressure control devices 300 are denoted by BP. The control signal BP is set using ΔVW, for example, based on an equation (12) shown below. In the equation (12), "$V_{target}$" represents a predetermined control target value, and "KC" represents a gain coefficient that is variably set in accordance with the running state of the vehicle or the condition of the road surface. FIG. 5 is a map showing a relation between the set control signals BP and the target fluid pressures controlled by the fluid pressure control devices 300.

$$BP^{} = KC \cdot (\Delta VW^{} - V_{target}) \qquad (12)$$

The embodiment described above handles, as an example, the case where the judgment on a decrease in the critical driving forces applied to the rear wheels is made depending on whether or not "the grip degrees of both the rear-left and rear-right wheels are high" in S110. As an example of methods of this judgment, the slip amounts $VWRL_{Slip}$, $VWRR_{Slip}$ of the rear-left and rear-right wheels RL, RR are compared with the predetermined threshold value $S_{th}$. However, the intention is not limited to this example. For example, it can be judged in S110 whether or not the vehicle is in its rectilinearly traveling state. The operation proceeds to S112 if the vehicle is in its rectilinearly traveling state, and the operation proceeds to S116 if the vehicle is in its turning state. This is based on the fact that the critical driving force applied to the inner one of the turning rear wheels falls and fosters the slip tendency due to a cause such as a decrease in the grounding load if the vehicle is in its turning state. Alternatively, if at least one of the rear-left and rear-right wheels RL, RR enters into a state where the critical driving force corresponding to the friction coefficient μ of the road surface and the grounding loads applied to the driven wheels has decreased or could decrease, the operation may proceed to the processing in S116 and the subsequent steps, so that synchronous control processings (S120, S124) for simultaneously setting an equal control amount ΔVWRL=ΔVWRR for the rear-left and rear-right wheels RL, RR are performed.

Figure 4:
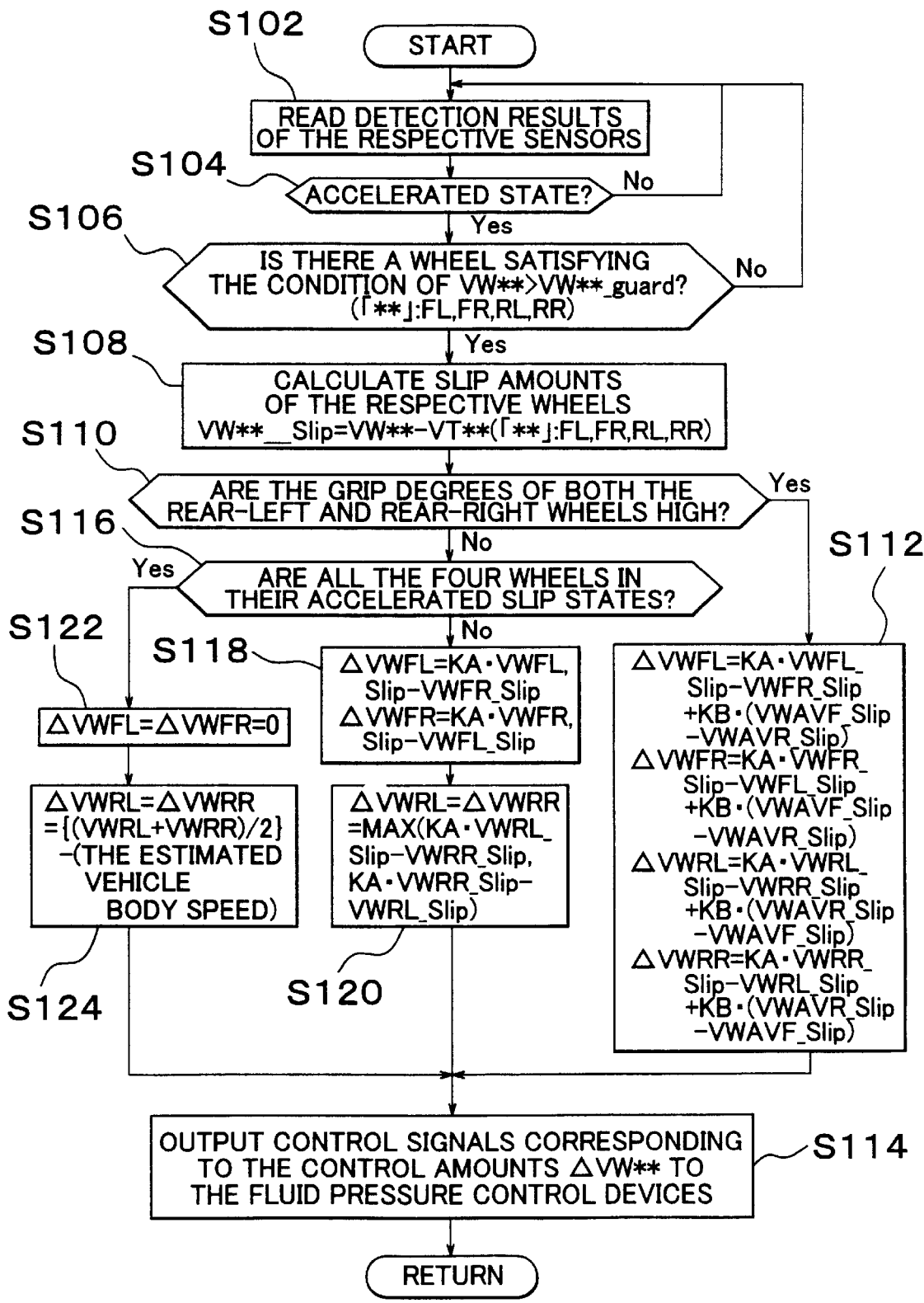
FIG. 4 is a flowchart showing control processing performed by the controller.

Under the circumstances where the condition of implementation according to this embodiment shown in FIG. 4 is fulfilled ("Yes" in S106), another condition for performing vehicle behavior control, for example for curbing the side slipping of the vehicle may be fulfilled. In such a case, for example, the control processings shown in FIG. 4 may be performed first, and the vehicle behavior control may be started after the slip tendency of the rear wheels has converged.

In the illustrated embodiment, the controller 100 is implemented as a programmed general purpose computer. It will be appreciated by those skilled in the art that the controller can be implemented using single special purpose integrated circuits (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A traction control apparatus disposed in a four-wheel drive vehicle in which driving torques of a drive source are distributed to front-left and front-right wheels and to rear-left and rear-right wheels, to control driving forces generated between the respective wheels and a road surface, comprising:

brake devices disposed in the respective wheels and generating predetermined braking forces to brake rotation of the wheels; and a controller that controls the braking forces generated in the respective brake devices, the controller simultaneously generates an equal braking force in the brake devices corresponding to the rear-left and rear-right wheels if it is judged that at least one of the rear-left and rear-right wheels tends to slip.

2. The apparatus according to claim 1, wherein the controller simultaneously generates an equal braking force in the brake devices corresponding to the rear-left and rear-right wheels if it is judged that all four wheels tend to slip.

3. The apparatus according to claim 2, wherein the controller generates braking forces in the front wheels such that driving forces applied to the front wheels are greater than driving forces applied to the rear wheels.

4. The apparatus according to claim 2, wherein the controller generates no braking forces in the front wheels.

5. The apparatus according to claim 1, wherein the controller sets the braking forces if it is judged that at least one of the rear-left and rear-right wheels tends to slip, in reference to a greater one of slip amounts of the rear-left and rear-right wheels.

6. The apparatus according to claim 5, wherein the controller generates braking forces in the front wheels such that driving forces applied to the front wheels are greater than driving forces applied to the rear wheels.

7. The apparatus according to claim 1, wherein the controller generates braking forces in the front wheels such that driving forces applied to the front wheels are greater than driving forces applied to the rear wheels.

8. A traction control method for controlling a four-wheel drive vehicle in which driving torques of a drive source are distributed to front-left and front-right wheels and to rear-left and rear-right wheels, to control driving forces generated between the respective wheels and a road surface, the four-wheel drive vehicle including brake devices disposed in the respective wheels to generate predetermined braking forces to brake rotation of the wheels, the method comprising the step of:

controlling the braking forces generated in the respective brake devices by simultaneously generating an equal braking force in the brake devices corresponding to the rear-left and rear-right wheels if it is judged that at least one of the rear-left and rear-right wheels tends to slip.

9. The method according to claim 8, wherein the controlling step simultaneously generates an equal braking force in the brake devices corresponding to the rear-left and rear-right wheels if it is judged that all four wheels tend to slip.

10. The method according to claim 9, wherein the controlling step includes generating braking forces in the front wheels such that driving forces applied to the front wheels are greater than driving forces applied to the rear wheels.

11. The method according to claim 9, wherein the controlling step includes generating no braking forces in the front wheels.

12. The method according to claim 8, wherein the controlling step includes setting the braking forces of the rear-left and rear-right wheels if it is judged that at least one of the rear-left and rear-right wheels tends to slip, in reference to a greater one of slip amounts of the rear-left and rear-right wheels.

13. The method according to claim 12, wherein the controlling step includes generating braking forces in the front wheels such that driving forces applied to the front wheels are greater than driving forces applied to the rear wheels.

14. The method according to claim 8, wherein the controlling step includes generating braking forces in the front wheels such that driving forces applied to the front wheels are greater than driving forces applied to the rear wheels.

* * * * *